Figure 1:
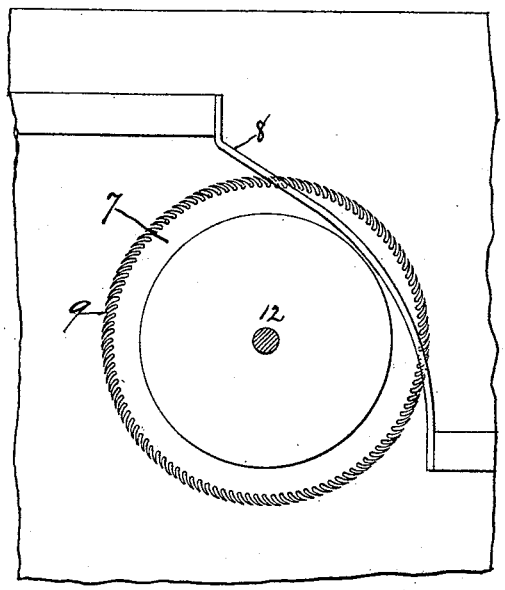

(No Model.) 2 Sheets—Sheet 1.

W. M. BROWN.
SAW GIN.

No. 438,676. Patented Oct. 21, 1890.

Witnesses:
S. B. Brewer
J. F. Harris

Walter Morton Brown,
Inventor.

(No Model.)
2 Sheets—Sheet 2.
W. M. BROWN.
SAW GIN.
No. 438,676. Patented Oct. 21, 1890.
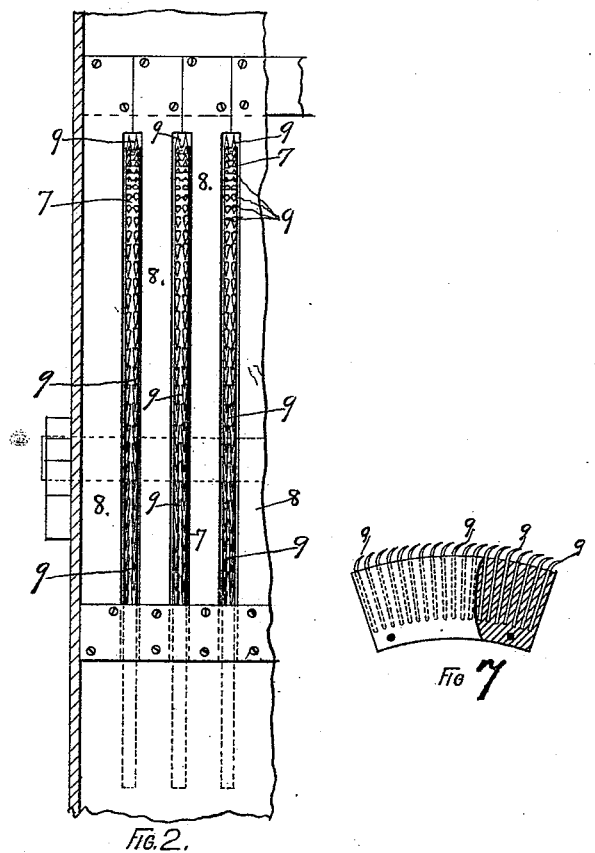
Fig. 2.
Fig. 7.
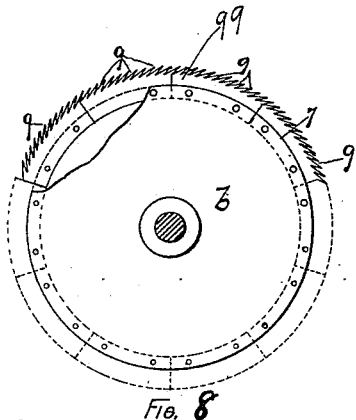
Fig. 8.
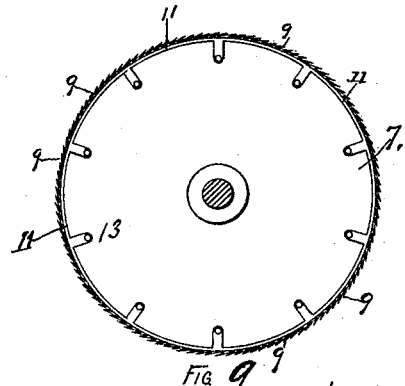
Fig. 9.
WITNESSES:
S. B. Brewer
J. F. Harris
INVENTOR:
Walter Morton Brown

UNITED STATES PATENT OFFICE.

WALTER MORTON BROWN, OF ALBANY, NEW YORK.

SAW-GIN.

SPECIFICATION forming part of Letters Patent No. 438,676, dated October 21, 1890.

Application filed February 6, 1889. Serial No. 298,920. (No model.)

*To all whom it may concern:*

Be it known that I, WALTER MORTON BROWN, a citizen of the United States, residing at Albany, in the county of Albany and State of New York, have invented certain new and useful Improvements in Saw-Gins; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a cotton-gin having improved saws or needle-saws and an improved arrangement of the saws.

In the drawings similar figures and letters refer to similar parts throughout the several views.

Figures 3, 4:
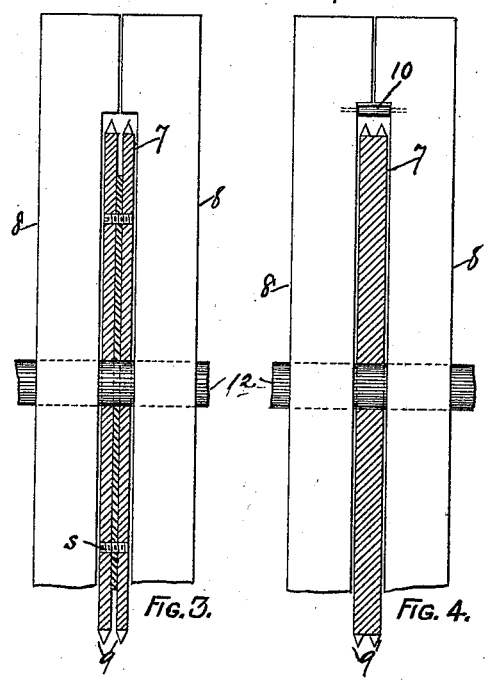
Figures 5, 6:
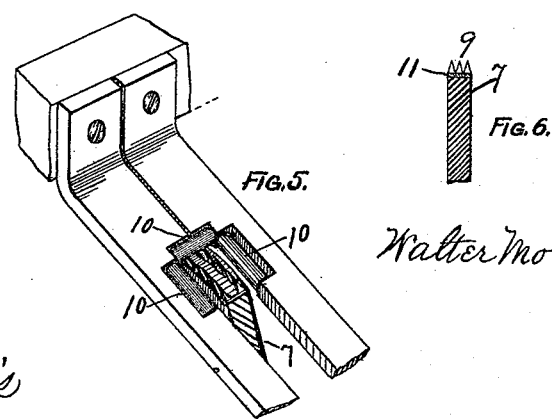

Figure 1 shows a side elevation of my gin-saw and a part of the gin in elevation, the saw having two rows of teeth standing side by side, only one row of teeth, however, being visible in this figure. Fig. 2 is a front elevation showing several saws and ribs, each saw having two rows of teeth, and these two rows of teeth being shown as revolving through a single space in or between the ribs, each saw having its appropriate opening through which it revolves. Fig. 3 shows one manner in which I obtain two rows of teeth and cause them to revolve in or through a single opening in or between the ribs, this figure showing two distinct saw-blades 7, each blade having but a single row of teeth; but the two blades are set near together with a washer or separating substance between them, and are then riveted or otherwise held in position, forming virtually one saw. Fig. 4 shows a similar view of one of my saws, the saw having a solid blade, but having two rows of teeth formed upon its periphery either by striking up the teeth or by cutting them in the saw-blade. Fig. 5 is an elevation of a part of a set of gin-ribs, showing revoluble rollers set at the sides of the opening in or between the ribs to reduce friction as the saw revolves through said opening. Fig. 6 is a section showing the blade to have three rows of teeth, which teeth may be cut or struck up from the blade or may be fastened into a band or tire 11 and shrunk on or otherwise held in position on the periphery of the saw-blade. Fig. 7 shows a portion of a gin-saw blade containing needles for teeth and having two rows of needle-teeth standing side by side, only one row being visible in the figure. Fig. 8 is a broken side elevation of a gin-saw wherein the blade is formed of segmental parts 9 9, the segments being riveted to the body *b* of the saw-blade. Fig. 9 is a side elevation of a gin-saw, showing the teeth of the saw formed on a band 11, of metal, which encircles a disk 7 on the saw-shaft 12, the band with its teeth being attached to said disk by means of lugs 13, riveted to the disk, as shown; but I do not confine myself to this method of fastening the band in position, as any well-known means may be used.

Referring to the drawings, the numeral 7 denotes the saw; 8, the ribs of the gin through or between which the saws revolve; 9, the teeth of the saws, set in two or more rows on each saw-blade; 10, revoluble rollers set in the openings in or between the ribs in order to reduce the friction on the cotton fiber.

9 in Fig. 6 denotes three rows of teeth set upon a band or tire 11, of metal, and shrunk or otherwise fastened around the periphery of the saw-blade.

In Fig. 3 I have shown two saw-blades riveted together or held together by screws *s*; but saws set as near together as these are need not be so fastened, as they may be set upon the saw-shaft 12 and held in position by any well-known means, in which case there need be no separating substance between the saw-blades. Any number of saws so set and made to revolve through a single opening in or between the ribs would be in effect a single saw.

I do not confine myself to the manner of setting the needles shown in Fig. 7. They may be held in position in double rows in any well-known manner.

The distinctive feature of my invention is a gin-saw having two or more rows of teeth standing side by side or staggered, said saw, with its teeth so set or formed, being caused to revolve through a single opening formed in or between the ribs of the gin. Heretofore all gins have had saws with but one row of teeth upon the saw-blade, and but one saw-blade has been caused to revolve through a single opening in the ribs of the gin.

The advantage gained by my disposition of the saws, as shown in Fig. 3, or as shown in those figures showing two or more rows of teeth or needles on a single saw-blade, is that as the saws revolve they present more teeth to the seed-cotton and catch more cotton fiber at each revolution than a saw with but a single row of teeth; and, again, as the teeth of the double or treble rows stand virtually side by side or alternately when staggered, the cotton fiber is caught along its length at as many different points as there are teeth standing side by side, and the strain on the cotton fiber as it is torn from the seed is not brought entirely upon a single spot or portion of the fiber, as is the case with all other gins, but is distributed along the fiber and does not tear or break it so readily. Again, that portion of the fiber which lies along the front faces of the teeth never comes in contact with the ribs of the gin, and as the distance across the front faces of the teeth in my saws is much greater than it can possibly be in a saw having but a single row of teeth the cotton fiber is not damaged so much by friction against the ribs and comes from the gin in much better condition than from gins as heretofore constructed.

The operation of my invention is as follows: The saws being caused to revolve and seed-cotton being in the hopper, the saws catch the fiber on both rows of teeth, and the greater portion of the cotton fiber lies against the front faces of the teeth and is thereby protected from coming in contact with the ribs, and in consequence the serrations on the edges of the fiber are preserved and the cotton rendered more valuable for thread-making and all other uses to which it may be put. The denuded seed fall down between the saws, or if saws in sets are used then between the sets of saws, and pass out of the gin, as in the ordinary cotton-gin.

Wherever the term "striking up the teeth" is used in this specification it is intended to signify the process whereby the teeth may be formed as by use of dies, &c., whereby the teeth are pressed or squeezed into shape. The needles 9 are preferably first inserted in a mold and held in position and molten metal poured around them, which, on cooling, holds them fast in position. These needles so held in position by the said metal are then held upon the ginning-cylinder by placing them between two rings or disks, and when the cylinder is full or has as many saws upon it as is required the rings or disks are turned up tightly by bolts, as is universally done in all needle-tooth gins.

The construction shown in Fig. 9 is the same as that shown in Fig. 6, except that lugs 13 are placed upon the edge of a band 11; but it is evident that this precise method of construction need not be followed, as the teeth may be held in position in any well-known manner.

Having fully described my invention, so that any one skilled in the art to which it appertains may make and use the same, what I desire to secure by Letters Patent is—

1. A cotton-gin having a series of saws having two or more rows of teeth or needles upon each saw and a space between the saws through which the denuded cotton-seed may pass on its way out of the gin, substantially as described.

2. Cotton-gin saws having two or more rows of teeth or needles on each saw and a space between the saws through which the denuded cotton-seed may pass on its way out of the gin, in combination with the ribs of the gin, said ribs having openings in or between them, said openings being arranged to correspond to said saws, in order that each of said saws may revolve through its appropriate opening, substantially as described.

3. Cotton-gin saws attached to the shaft of the ginning-cylinder, said saws being arranged in sets of two or more saws each and with a space between the sets of saws through which the denuded cotton-seed may pass on its way out of the gin, in combination with the ribs of a gin, said ribs having openings in or between them, said openings being arranged to correspond with said sets of saws, in order that each set of saws may revolve through its appropriate opening in said ribs, substantially as shown and described.

In testimony whereof I affix my signature in presence of two witnesses.

WALTER MORTON BROWN.

Witnesses:
J. F. HARRIS,
J. J. BURNS.